Patented June 4, 1946

2,401,645

UNITED STATES PATENT OFFICE 2,401,645

CHEMICAL PROCESSES AND PRODUCTS

Ralph K. Iler, Cleveland Heights, Ohio, assignor to E. I. du Pont de Nemours & Company, Wilmington, Del., a corporation of Delaware No Drawing. Application December 31, 1943, Serial No. 516,587

14 Claims. (Cl. 260—113)

This invention relates to solubilizing hydrophilic, insoluble proteins and subsequently insolubilizing such proteins and rendering them hydrophobic, is more particularly directed to processes and compositions in which a water-insoluble, hydrophilic protein and a water-soluble chromic salt are dissolved in a mutual solvent and, preferably, the solution is heated, whereby a water-soluble complex compound of the protein and chromic salt is formed, and is further directed to processes in which solvent is removed from such compositions and to the insoluble, hydrophobic, chromic-protein products thus obtained.

Proteinaceous materials have been widely used as coating compositions, sizes, textile finishes, and for other similar purposes. In order to employ water-insoluble proteins for such purposes, however, it has heretofore been the practice to dissolve the proteins either in an organic solvent, or in an aqueous medium containing alkali or acid. For instance, alkaline materials such as borax or ammonia, or acids such as acetic acid, have been used for effecting dissolution of ordinarily water-insoluble proteins.

The methods heretofore used for solubilizing proteins have been subject to various objections. Relative to water, all the organic solvents which are useful are also expensive. For most purposes the solution must be used at a high degree of dilution and this entails either the loss of large quantities of organic solvents or expensive recovery systems. On the other hand, if acids or alkalies are used to dissolve the proteins the objection is encountered that many of the materials on which the solutions are used, such as paper and textiles, are sensitive to acid and alkali and are deleteriously affected. Moreover, the coatings obtained from such solutions and from organic solutions have at best only the water resistance of the original protein.

In my U. S. Patent 2,273,040, issued February 17, 1942, Serial No. 358,479, and my application Serial No. 402,995, filed July 18, 1941, now U. S. Patent No. 2,273,040, I have described certain water-soluble complex compounds of the Werner type in which trivalent nuclear chromium atoms are coordinated with carboxylic acido groups having at least ten carbon atoms and the application of such compositions to the surfaces of various materials to increase the hydrophobic character of the surfaces. While the surfaces of proteinaceous bodies such as zein coatings may thus be made water-repellent, there are many situations in which a surface type of coating, no matter how effective, is not adequate. For instance, when bodies or articles coated with zein are subject to wear and abrasion, any treatment which makes only the surface hydrophobic will soon be worn off and its effectiveness will be lost. In such cases it is important to impart to the coating a substantially uniform hydrophobic character throughout a substantial thickness. The problem thus becomes one of providing a method for improving the zein or other proteinaceous material so as to make it hydrophobic instead of hydrophilic.

Now I have found that proteins which ordinarily are hydrophilic but water-insoluble may be solubilized and subsequently insolubilized and rendered hydrophobic by dissolving in a mutual solvent such a protein and a water-soluble chromic salt and, preferably, heating the solution, whereby a novel, water-soluble complex compound of the protein and chromic salt is formed, and by removing solvent from such solutions, whereby insoluble, hydrophobic chromic-protein products are obtained.

The field of usefulness of proteins is extended through the application of my invention. By incorporating a relatively small proportion of the complex chromium compound into zein, for instance, and coating or impregnating paper with the resultant composition, a coated or filled paper is obtained which is highly resistant to both oil and water. In contrast, paper coated with zein by methods heretofore available, while resistant to oil, is hydrophilic and readily softened by water. The compositions of my invention may be applied from aqueous solutions in which there is present neither acid nor alkali and deleterious effects upon the substances treated are consequently avoided. Moreover, the water-resistant coatings produced according to my invention have substantial thickness and can stand considerable handling and abrasion without being rubbed off.

In describing my invention, it is necessary to use certain terms pertaining to the behavior of substances with respect to water, and while these terms are used in their accepted and ordinary meaning, the nature of my invention may perhaps be made more clear by a fuller understanding of such terms. Thus, by "soluble" is meant the property of mixing with a liquid to form a homogeneous mixture, while "insoluble" means a lack of such property. "Hydrophilic" refers to the ability of a substance to absorb or adsorb water and, conversely, "hydrophobic" refers to a lack of such ability. In other words, a substance may be insoluble in water but nevertheless hydrophilic, that is, it may not dissolve in the water to make a homogeneous mixture, but at the same time it may absorb water, swelling up and becoming slimy or sticky. On the other hand, hydrophobic substances are substantially impervious to the action of water and tend to be water-repellent, that is, to resist wetting by water.

The present invention comprehends the treatment of any water-insoluble protein, but it is preferred to use proteins which are alcohol-soluble. The protein may be of either animal or vegetable origin, and may be simple, conjugated, or derived. Representatives of the insoluble proteins are, for instance, prolamines or gliadins. Zein, gliadin, hordein, and bynin may be used to especial advantage.

Instead of a normal chromic salt there may be used a water-soluble complex compound of the Werner type in which a trivalent nuclear chromium atom is coordinated with a carboxylic acido group having at least ten carbon atoms. Such compounds may be prepared by processes in which contact, in the substantial absence of free water, is effected between carboxylic acido groups having at least ten carbon atoms and basic trivalent chromium salts having a basicity no greater than about 50%. Such preparations, employing acyclic acido groups, are described fully in my U. S. Patent 2,273,040. Processes using cyclic acido groups, such as abietic, naphthenic, or naphthoic acid groups, are carried out as described in my previously-mentioned patent application, Serial No. 402,995, filed July 18, 1941, that is, by effecting contact, in the substantial absence of free water, of a carboxylic acido group having at least ten carbon atoms with a basic trivalent chromium salt of a monobasic acid, the basicity of the chromium salt being no greater than about 50%. The basic trivalent chromium salt may be one such as described in the above-mentioned Patent 2,273,040 and contact may be effected as also described therein. Likewise, the terms "free water," "acido groups" and "functional acido group" are used herein in the sense defined in that patent.

If the functional acido groups are carbocyclic, they must contain more than ten carbon atoms and these carbon atoms must be present in a cyclic structure, but the cyclic structure may comprise a single ring or a number of rings and a portion of the carbon atoms may be present as the side chains. The acidic nature of the group must be due to a carboxyl group, but this may be present either on the cyclic structure directly or on a chain. Typical, therefore, of the cyclic carboxylic acido groups which may be employed are aryl carboxylic acids such as those having a benzene ring nucleus with carbon chain substitutions on the ring, alpha- and beta-naphthoic acids, and those having more complicated ring structures such as those derived from phenanthrene. The abietic acid in rosin, being methyldecahydroretene carboxylic acid, may be regarded as being of the latter type. The cyclic group may be a saturated ring such as occurs in cyclodecane and its homologues. The ring structure may be aralkyl, containing an aryl group as a substitution on an alkyl group to which the carboxyl group is attached as in the case of naphthyl-acetic or -propionic acids. It will be seen, therefore, that the functional acido groups may have any configuration so long as there is present a ring structure and the entire group contains at least ten carbon atoms.

For convenience of reference chromium coordination compounds as above described will hereinafter be referred to as "Werner complexes."

While any of the Werner complexes referred to in my beforementioned patent applications may be employed in the present invention, I prefer to use, of the acyclic compounds, stearato chromic chloride, palmitato chromic chloride, or laurato chromic chloride, and of the carbocyclic compositions, abietato chromic chloride, naphthenato chromic chloride, or naphthoato chromic chloride.

The proportion of chromic salt required for treatment of a protein, according to my invention, may be considerably varied. The proportion should be at least large enough to exhibit a definite effect, but, on the other hand, the proportion required to show an effect is usually surprisingly small. I have found that if the weight of protein is about from 5 to 200 times the weight of chromic salt, a marked effect is obtained and for best results, particularly with zein, I prefer to use a weight of zein about from 10 to 100 times the weight of chromic salt, the preferred chromic salt for these proportions being stearato chromic chloride.

Having selected a protein and a chromic salt in the desired proportions, these components are then dissolved in a mutual solvent. The components may be dissolved in separate portions of solvent and the solutions obtained may be mixed, or they may be dissolved simultaneously or consecutively in the same body of solvent. The solvent should be one capable of holding both the protein and the chromic salt in solution. Since the protein is insoluble in water, the solvent should preferably be predominantly nonaqueous, although when ethyl alcohol is the solvent, it is advantageous to have a small amount of water present—say 5 to 25% by volume. In some instances the chromic salt may be dissolved in water and the protein in a water-miscible organic solvent and a solution obtained by mixing the two separate solutions. Ordinarily, however, it is preferred to employ an organic solvent for both the chromic salt and protein, such as ethanol or isopropanol.

The concentration of protein-chromic salt mixture in the solution thus obtained may be widely varied. If the solution is to be stored or shipped, it will, for economic reasons, be desirable to have a relatively large proportion of solid ingredients in the solution, but on the other hand, if the solution is made up at its point of use a dilute solution may be equally advantageous. Ordinarily, it is preferred that the solution contain about from 2 to 50% of solids.

The protein and chromic salt appear to be present in the mutual solvent in the form of some kind of complex. This complex forms spontaneously in the solution upon standing and its formation may be accelerated by heating the solution. It is definitely undesirable, however, to continue the heating for too long a time, since this tends to make the solution unstable. Best results are obtained by heating the solution nearly to the boiling point momentarily and then cooling.

The product thus obtained is characterized by the fact that it is water-soluble in contrast to the insoluble character of the original protein.

From the novel solutions of my invention, obtained as above described, water-insoluble hydrophobic products may be obtained by removal of the solvent. Such removal may be accomplished by techniques with which the art is already familiar, such as evaporating at elevated temperature and if desired under reduced pressure. The form in which the final product is desired will in many instances determine the manner of solvent removal. Thus, for coating paper, the solution may be run upon the paper and dried as a coating on the paper, optionally under calendering rolls. On the other hand, if a cast film is desired, the solution may be run upon a heated casting surface and dried as a sheet.

The precaution above noted against prolonged heating of the protein-chromic salt solution obviously does not apply when insolubilization of the product is desired, but on the contrary, it may be desirable to heat the dried product at an elevated temperature for a period long enough to insure complete solvent removal, since by such drying, if the solvent be water, an irreversible dehydration takes place.

The product obtained is characterized by being hydrophobic and insoluble in water. It may be in the form of a film, a fiber, a solid body, or a coating or impregnation upon a supporting body such as paper or textile.

The processes and compositions of the present invention may find use in a wide variety of applications. Thus, the solutions may be used as coating compositions, adhesives, water paints, and plastics and in the production of synthetic fibers. In all of these applications insolubilization of the protein is often desired, and the methods of this invention are very useful in effecting such insolubilization. Water-impervious films may likewise be produced according to this invention.

The nature of my invention will be better understood by reference to the following illustrative examples, but these examples are to be construed only as expositive and not as limiting.

Example 1 illustrates the practice of the invention where the protein is zein and the chromic salt is stearato chromic chloride.

Example 1

In this example the zein used was in the form of a commercial product known as Mazein made by the Corn Products Refining Company. Five parts of Mazein were dissolved in 50 parts of 90% ethyl alcohol. To this solution was added 0.75 part of a 33% solution of stearato chromic chloride in ethyl alcohol. There was obtained a clear, dark green solution which after standing overnight was found to be miscible with water to give clear solutions. Films of the alcoholic solution and of a similar unmodified zein solution in alcohol were formed on glass by spreading the solutions and permitting them to dry. The unmodified zein film adhered strongly to the glass and in water softened, turned white, and became very weak. On the other hand, zein films containing stearato chromic chloride were water-resistant and the water resistance was enhanced by heating at 105° C. Moreover, the latter films were easily stripped from the glass casting surface in the form of a film of appreciable strength.

Example 2 illustrates the practice of the invention where the chromic salt used is normal chromic chloride.

Example 2

To 25 parts by weight of Mazein dissolved in 105.4 parts by weight of 85% ethyl alcohol, there was added a solution of 3.2 parts of green chromic chloride ($CrCl_3.6H_2O$) dissolved in 7.9 parts of isopropanol. The resulting mixture was a clear green solution. This solution was heated to the boiling point for 3 to 5 minutes, after which it was cooled. The solution thus obtained was found to be soluble in a fivefold volume of water at about 35° C.

Example 3 illustrates the adaptation of the compositions and processes of this invention to the coating of paper.

Example 3

One hundred grams of zein was dissolved in 200 cc. of 95% ethyl alcohol and 20 cc. of diethyl Cellosolve. To this solution was added 15 grams of chromic chloride separately dissolved in 85 cc. of ethyl alcohol. The mixture was warmed to 60° C. for one minute and cooled. It was then divided into two equal portions. The first portion was diluted with alcohol to 300 cc. volume. One part by volume of this solution was poured into 25 parts of water, whereby an aqueous dispersion was obtained and this dispersion was spread on a white sulfite paper, dried, and heated for 15 seconds at 120° C. It was found that the paper could be washed with water for 3 minutes at 80° C. without showing any sign of being affected by the water.

The second portion of the above mixture was diluted to 500 cc. of alcohol. Fifty parts of Georgia kaolin clay were mixed with 100 parts of water acidified to pH 4.5 with acetic acid and 25 parts of the diluted zein solution was added with stirring. A smooth suspension was obtained which gave an excellent coating when applied to the paper. After heating for 15 seconds at 120° C. this coating was very water-resistant.

While in the foregoing description of my invention I have shown certain specific compositions and processes, it will be understood that without departing from the spirit of my invention one skilled in the art may employ numerous processes and produce various compositions.

I claim:

1. In a process for producing soluble complex compounds of protein and chromium, the step comprising dissolving a prolamine and a water-soluble chromic salt in a mutual solvent.

2. In a process for producing soluble complex compounds of protein and chromium, the steps comprising dissolving a prolamine and a water-soluble chromic salt in a mutual solvent, and heating the solution.

3. In a process for producing soluble complex compounds of protein and chromium, the step comprising dissolving stearato chromic chloride and zein in aqueous ethyl alcohol.

4. In a process for producing soluble complex compounds of protein and chromium, the steps comprising dissolving stearato chromic chloride and zein in aqueous ethyl alcohol, the weight of zein being about from 10 to 100 times the weight of stearato chromic chloride, and heating the solution.

5. A composition comprising a solution of a prolamine and a water-soluble chromic salt in a mutual solvent.

6. A composition comprising an alcoholic solution of a prolamine and a water-soluble chromic salt.

7. A composition comprising an alcoholic solution of stearato chromic chloride and zein.

8. A composition comprising an alcoholic solution of stearato chromic chloride and zein, the weight of zein being about from 10 to 100 times the weight of stearato chromic chloride.

9. In a process for producing water-insoluble, hydrophobic, chromic-protein products, the steps comprising dissolving a prolamine and a water-soluble chromic salt in a mutual solvent and thereafter removing the solvent from the solution.

10. In a process for producing water-insoluble, hydrophobic, chromic-protein products, the steps comprising dissolving stearato chromic chloride and zein in aqueous ethyl alcohol and evaporating the solution substantitally to dryness.

11. In a process for producing water-insoluble, hydrophobic, chromic-protein products, the steps comprising dissolving stearato chromic chloride and zein in aqueous ethyl alcohol, the weight of zein being about from 10 to 100 times the weight of stearato chromic chloride, heating, and evaporating the solution substantially to dryness.

12. A water-insoluble, hydrophobic, chromic-protein composition comprising the reaction product obtained by dissolving a prolamine and a water-soluble chromic salt in a mutual solvent, heating, and evaporating the solution substantially to dryness.

13. A water-insoluble, hydrophobic, chromic-protein composition comprising the reaction product obtained by dissolving stearato chromic chloride and zein in aqueous ethyl alcohol, heating, and evaporating the solution substantially to dryness.

14. A water-insoluble, hydrophobic, chromic-protein composition comprising the reaction product obtained by dissolving stearato chromic chloride and zein in aqueous ethyl alcohol, the weight of zein being about from 10 to 100 times the weight of stearato chromic chloride, heating, and evaporating the solution substantially to dryness.

RALPH K. ILER.